3,062,855
CYANOPENTAISONITRILE-IRON(II) SALTS

Walter Z. Heldt, Wilmington, Del., assignor to E. I. du Pont de Nemours and Company, Wilmington, Del., a corporation of Delaware
No Drawing. Filed July 15, 1960, Ser. No. 42,961
19 Claims. (Cl. 260—439)

This invention relates to a new class of organo-iron compounds. More particularly it relates to cyanopentaisonitrile-iron(II) salts and to a method for their preparation.

Organometallic compounds are of interest for a number of important applications. Outstanding examples are the carbonyls of metals such as iron, cobalt, nickel and manganese which are useful catalysts as well as intermediates in many organic reactions. Others are the Grignard reagents, so important in organic syntheses, and tetraethyl lead, which is used extensively as an antiknock in motor fuels.

This invention has as an object the provision of new organometalic compounds. It has an another object the provision of organo-iron complexes which are useful catalysts and intermediate inorganic syntheses. A further object is the provision of a convenient and simple process for the preparation of these new and useful complexes. Other and additional objectives will become apparent from a consideration of the following specification and claims.

The objectives of this invention have been accomplished by providing a new class of complex compounds containing iron which have many unusual and unexpected properties. The novel compounds are represented by the general formula $$[FeZ_5CN]_yX$$

wherein Z represents a substituted methylisonitrile ligand having at least one carbon-to-carbon multiple bond adjacent and singly bound to the alpha carbon atom; X denotes an anion, and $y$ is an integer equal in magnitude to the valence of the anion.

Preferably, the Z groups have the formula $$R_2'R''CNC$$

wherein each of the R' radicals is either hydrogen, lower alkyl (one to six carbon atoms in the main chain), or aryl; R" is a radical containing at least one carbon-to-carbon multiple bond. The radical R" is bonded to the adjacent carbon through one of the multiple-bonded carbon atoms.

The isonitrile-iron compounds of this invention are obtained by mixing at a temperature above about 50° C. either an alkali metal ferrocyanide or a tetrasubstituted ammonium ferrocyanide with an alkylating agent of the formula $$R_2'R''CX'$$

wherein each of the R' radicals is either hydrogen, lower alkyl (one of six carbon atoms) or aryl; R" is a radical containing at least one carbon-tocarbon multiple-bond adjacent and singly bound to the carbon atom, and X' denotes an anion selected from the group consisting of chloride, bromide and sulfonate.

No catalyst is required and the reaction takes place readily in the absence of solvent. Thus, the reaction is conveniently carried out by mixing the ferrocyanide and the alkylating agent together at room temperature and heating the mixture until the reaction is essentially complete. The complex is separated from the reaction mixture as a salt. Other salts may be prepared from these products by metathetical reactions.

By the term "anion' as used herein is meant any of the so-called "true" anions listed in Appendix III, p. 5957 in "The Naming and Indexing of Chemical Compounds by Chemical Abstracts" (Introduction to the 1945 Subject Index).

Typical of the Z groups are benzylisonitrile, allylisonitrile, p-methylbenzylisonitrile, triphenylmethylisonitrile, and the like. The anions are typified by iodide, chloride, perchlorate, ferricyanide, nitrate, sulfate, tosylate, trifluoroacetate, and similar ions.

Compounds representative of the invention are:

Cyanopenta(p - chlorobenzylisonitrile)iron(II) perchlorate,
$$[Fe(p-ClC_6H_4CH_2NC)_5CN]ClO_4$$
Cyanopenta(1-phenylethylisonitrile)iron(II) nitrate,
$$[Fe(C_6H_5CH(CH_3)NC)_5CN]NO_3$$
Cyanopentallylisonitrile iron(II) bromide,
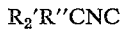
$$[Fe(CH_2\!\!=\!\!CH\!\!-\!\!CH_2\!\!-\!\!NC)_5CN]Br$$
Cyanopentabenzylisonitrile iron(II) chloride,
$$[Fe(C_6H_5CH_2NC)_5CN]Cl$$
Cyanopenta(2-furfurylisonitrile)iron(II) trifluoroacetate,
$$[Fe(C_4H_3OCH_2NC)_5CN]CO_2CF_3$$
Cyanopenta(p-methylbenzylisonitrile)iron(II) fluoride,
$$[Fe(p-CH_3C_6H_4CH_2NC)_5CN]F$$
etc.

In the following examples, all parts are given by weight unless otherwise specified.

EXAMPLE I

*Preparation of Cyanopentabenzylisonitrile Iron(II) Bromide, $[Fe(C_6H_5CH_2NC)_5CN]Br$*

Potassium ferrocyanide, 61.5 parts, prepared from the trihydrate by heating at 150° C. under 24 mm. of Hg pressure for four hours, and benzyl bromide, 171 parts, are heated together with stirring on a steam bath for 50 hours in a flask closed by calcium chloride drying tubes. The brown, viscous reaction mixture is washed with petroleum ether, and the brown oil which remains is extracted with boiling chloroform. The chloroform extract is evaporated to drynes under vacuum without heating. The brown residue is dissolved in boiling methyl ethyl ketone, and upon cooling a slightly yellow crystalline material separates out. After 10 recrystallizations from methyl ethyl ketone and drying under 0.1 mm. of Hg pressure at 25° C. for six hours, the crystalline hydrate, $[Fe(C_6H_5CH_2NC)_5CN]Br \cdot H_2O$, melting over the range 101–104° C. is obtained. Prolonged drying under the same conditions yields the anhydrous salt, having a melting point of 111–112° C.

Calculated for $[Fe(C_6H_5CH_2NC)_5CN]Br$: C, 65.87; H, 4.87; N, 11.24; Fe, 7.47; Br, 10.69. Found: C, 65.74; H, 5.08; N, 11.28; Fe, 7.41; Br, 11.35.

EXAMPLE II

*Preparation of Cyanopentabenzylisonitrileiron (II) Nitrate, $[Fe(C_6H_5CH_2NC)_5CN]NO_3$*

To a solution containing 7.86 parts of the monohydrated bromide salt, prepared as described in Example I, in 32 parts of absolute ethyl alcohol is added a solution containing 1.69 parts of silver nitrate in 10 parts of distilled water. The silver bromide precipitate is removed by filtration, and the filtrate is evaporated to dryness under vacuum. The solid residue is dissolved in acetone, and carbon tetrachloride is added until the solution just becomes cloudy. The solution is cooled in Dry Ice and then allowed to stand at room temperature for several days. Two different kinds of rosette-like crystals are obtained which are separated mechanically into a fraction designated A, melting over the range 85–87° C., and a fraction designated B, melting over the range 105–107° C.

Crystals from fraction A (0.67 part) are dissolved in methyl ethyl ketone, and the solution is poured onto a chromatographic column containing alumina suspended in carbon tetrachloride. Elution is performed with the following eluting agents, listed in order of use; their compositions are expressed in volume percent: 10% chloroform-carbon tetrachloride; 30% chloroform-carbon tetrachloride; 50% chloroform-carbon tetrachloride; and chloroform. The final eluate fraction, collected from the chloroform elution, is evaporated to dryness under vacuum. Recrystallization from a chloroform-carbon tetrachloride mixture and from methyl ethyl ketone follows. After drying, a compound identified by analyses as $[Fe(C_6H_5CH_2NC)_5CN]NO_3 \cdot H_2O$ is obtained which melts over the range 85.5–87.5° C.

The crystalline fraction designated B is dissolved in methyl ethyl ketone and passed through a short column containing alumina suspended in methyl ethyl ketone. The effluent is concentrated and fractionally crystallized. The main crop of crystals melts over the range 106–108° C., after drying under 0.4 mm. Hg pressure at 25° C. The compound analyzes for $[Fe(C_6H_5CH_2NC)_5CN]NO_3$.

Calculated for $[Fe(C_6H_5CH_2NC)_5CN]NO_3$: C, 67.50; H, 4.83; N, 13.44; Fe, 7.66. Found: C, 67.38; H, 4.95; N, 13.31; Fe, 7.70.

EXAMPLE III

*Preparation of Cyanopentabenzylisonitrileiron(II) Perchlorate, $[Fe(C_6H_5CH_2NC)_5CN]ClO_4$*

A solution containing 7.2 parts of the bromide monohydrate complex described in Example I in 40 parts of methanol is added to a solution containing 10.6 parts of lithium perchlorate in 80 parts of methanol. The reaction mixture is then evaporated to dryness under vacuum, and the residue is extracted with chloroform. The chloroform extract is passed through a short column containing alumina suspended in carbon tetrachloride. The effluent is evaporated to dryness, and the residue is recrystallized four times from methyl ethyl ketone, yielding crystalline $[Fe(C_6H_5CH_2NC)_5CN]ClO_4$. The product melts over the range 139–140° C. after drying under 0.1 mm. pressure at 25° C.

Calculated for $[Fe(C_6H_5CH_2NC)_5CN]ClO_4$: C, 64.19; H, 4.60; N, 10.96; Cl, 4.62; Fe, 7.28. Found: C, 64.32; H, 4.46; N, 10.81; Cl, 4.26; Fe, 7.48.

EXAMPLE IV

*Preparation of Cyanopentabenzylisonitrileiron(II) Ferricyanide, $[Fe(C_6H_5CH_2NC)_5CN]_3Fe(CN)_6$*

A solution containing 3.3 parts of potassium ferricyanide in 40 parts of water is added to a methanolic solution containing 7.2 parts of the bromide monohydrate salt, described in Example I. The mixture is evaporated to dryness under vacuum and the residue is extracted with chloroform. The chloroform extract is chromatographed on alumina suspended in carbon tetrachloride. The eluting solvents in order of their use, with compositions expressed in volume percent, consist of the following: chloroform; 50% chloroform-acetone; acetone; and 50% acetone-methanol. The fraction from the acetone-methanol elution is evaporated to dryness and the residue is recrystallized twice from an ethanol-water mixture and finally from a methyl ethyl ketone-water mixture. After drying under 0.1 mm. of Hg pressure at 56° C., a compound, melting over the range 130–131° C. is obtained. The compound analyzed for $[Fe(C_6H_5CH_2NC)_5CN]_3Fe(CN)_6 \cdot 5H_2O$ Calculated for $[Fe(C_6H_5CH_2NC)_5CN]_3Fe(CN)_6 \cdot 5H_2O$ C, 67.30; H, 4.96; N, 14.60; Fe, 9.70. Found: C, 67.18; H, 5.02; N, 13.75; Fe, 9.69.

EXAMPLE V

*Preparation of Cyanopentabenzylisonitrileiron(II) Trifluoroacetate, $[Fe(C_6H_5CH_2NC)_5CN]CO_2CF_3$*

To a solution containing 3.2 parts of silver trifluoroacetate in 50 parts of water is added a solution containing 7.1 parts of the monohydrated bromide salt, described in Example I, in 32 parts of methanol. Silver bromide is removed by filtration, and the filtrate is evaporated to dryness under vacuum. The residue is dissolved in methyl ethyl ketone, and when ethyl acetate is added to the solution, a crystalline material separates out. The crystals are redissolved in chloroform, and the solution is passed through a short column of alumina suspended in chloroform. Evaporation of the effluent yields crystalline $[Fe(C_6H_5CH_2NC)_5CN]CO_2CF_3$ which, when recrystallized from methanol and dried under 0.1 mm. of Hg pressure at 25° C., melts over the range 113–115° C.

Calculated for $[Fe(C_6H_5CH_2NC)_5CN]CO_2CF_3$: C, 66.16; H, 4.51; N, 10.75; Fe, 7.14. Found: C, 66.49; H, 5.09; N, 10.79; Fe, 7.63.

EXAMPLE VI

*Preparation of Cyanopenta(p-Methylbenzylisonitrile) Iron(II) Bromide, $[Fe(p-CH_3C_6H_4CH_2NC)_5CN]Br$*

The compound p-methylbenzyl bromide, 93 parts, and 37 parts of potassium ferrocyanide are heated together on a steam bath for 64 hours in a flask closed with calcium chloride drying tubes. After cooling, the reaction mixture is extracted first with petroleum ether and then with boiling chloroform. The chloroform extract is evaporated to dryness under vacuum at 25° C., and the residue obtained is crystallized from methyl ethyl ketone. After five recrystallizations, yellow plate-like crystals are obtained which are dried at 25° C. under 0.1 mm. of Hg pressure. The product analyzes as $[Fe(p-CH_3C_6H_4CH_2NC)_5CN]Br$ and melts over the range 147.8 to 149.8° C.

Calculated for $[Fe(p-CH_3C_6H_4CH_2NC)_5CN]Br$: C, 67.57; H, 5.55; N, 10.28; Fe, 6.83; Br, 9.77. Found: C, 66.78; H, 5.67; N, 10.26; Fe, 6.96; Br, 9.29.

EXAMPLE VII

*Preparation of Cyanopentaallylisonitrileiron(II) Bromide, $[Fe(CH_2=CH—CH_2NC)_5CN]Br$*

The compound 3-bromopropene, 121 parts, 1.6 parts of potassium iodide and 61 parts of potassium ferrocyanide are heated together on a steam bath with rapid stirring for 48 hours. After cooling, the brown reaction mixture is extracted with petroleum ether. The petroleum ether insoluble material is further extracted with boiling chloroform. The chloroform extract is evaporated to dryness, yielding 85 parts ($\cong$95% conversion) of a brown oil which crystallizes from an equal volume of acetone on standing. After two recrystallizations from acetone and drying at 25° C. under 0.1 mm. of Hg pressure, cyanopentaallylisonitrileiron(II) bromide, which melts over the range 56–58.5° C., is obtained.

Calculated for $[Fe(CH_2=CH—CH_2NC)_5CN]Br \cdot H_2O$

C, 50.72; H, 5.07; N, 16.91; Fe, 11.23; Br, 16.07. Found: C, 50.35; H, 5.46; N, 16.23; Fe, 10.58; Br, 15.85.

EXAMPLE VIII

*Preparation of Cyanopentabenzylisonitrileiron(II) Bromide From Sodium Ferrocyanide Monohydrate and Benzyl Bromide*

Benzyl bromide, 100 parts, and sodium ferrocyanide monohydrate, 106 parts, are heated together on a steam bath for 48 hours. After cooling, the mixture is extracted with petroleum ether. The petroleum ether insoluble material is further extracted with boiling chloroform. The chloroform extract is evaporated to dryness, yielding 60 parts (65% conversion) of a dark colored oil, which is crystallized from methyl ethyl ketone. After several recrystallizations from methyl ethyl ketone, 56 parts of a slightly yellow crystalline material is obtained.

The crystals melt over the temperature range 110–112° C. The product does not give a melting point depression with a sample of [Fe(C₆H₅CH₂NC)₅CN]Br, prepared as in Example I, and infrared spectra of the two samples are superimposable.

EXAMPLE IX

*Preparation of Cyanopentabenzylisonitrileiron(II) Chloride From Potassium Ferrocyanide and Benzyl Chloride*

Benzyl chloride, 126 parts, and potassium ferrocyanide, 61 parts, are refluxed together for four hours with rapid stirring. After cooling to room temperature, the reaction mixture is extracted with petroleum ether. The petroleum ether insoluble residue is then extracted with boiling chloroform. The chloroform extract is evaporated to dryness under reduced pressure yielding an oil which crystallizes from methyl ethyl ketone. After several recrystallizations from methyl ethyl ketone, a slightly yellow material, melting over the range 106–108° C., is isolated. The product does not depress the melting point of a sample of [Fe(C₆H₅CH₂NC)₅CN]Cl prepared metathetically, and infrared spectra of the two samples are superimposable.

EXAMPLE X

*Preparation of Cyanopentabenzylisonitrileiron(II) p-Toluenesulfonate*

[Fe(C₆H₅CH₂NC)₅CN]OSO₂C₆H₄—p—CH₃

A mixture containing 39.3 parts of benzyl p-toluenesulfonate, 11 parts of potassium ferrocyanide and 160 parts of dried methyl ethyl ketone is heated at reflux for 96 hours. The reaction mixture is filtered hot, and after cooling, the solvent is evaporated from the filtrate under vacuum. The residue is extracted with boiling chloroform. Evaporation of the extract under vacuum yields 8 grams of an oily residue. Several attempts to crystallize the oil are not successful. However, confirmation of the formation of cyanopentabenzylisonitrileiron(II) tosylate is obtained indirectly by the isolation of crystalline cyanopentabenzylisonitrileiron(II) perchlorate upon treating the oil with sodium perchlorate.

The oil containing the tosylate complex is dissolved in 40 parts of methanol. To this solution is added an aqueous solution containing 12 parts of sodium perchlorate. The mixture is heated until all the material dissolves and the resulting solution is then reduced to dryness and redissolved in a minimum of chloroform. The chloroform solution is chromatographed on alumina following the procedure described in Example III. A crystalline product, identical with a sample of cyanopentabenzylisonitrileiron(II) perchlorate prepared as in Example III, is obtained.

EXAMPLE XI

*Preparation of Cyanopentabenzylisonitrileiron(II) Thiocyanate,* [Fe(C₆H₅CH₂NC)₅CN]SCN A solution containing 7.1 parts of cyanopentabenzylisonitrileiron(II) bromide in methyl alcohol is treated with a solution containing 10 parts of potassium thiocyanate in water. The mixture is allowed to stand at room temperature for 14 days and then is evaporated to dryness under vacuum. The residue is extracted with boiling chloroform, and the extract is washed with water and dried with magnesium sulfate. The magnesium sulfate is removed, and the dried solution is evaporated to dryness under vacuum. The solid residue is crystallized from cold methyl ethyl ketone. After drying under 0.1 mm. of Hg pressure at 25° C., the crystals melt over the range 110–111° C. Analyses confirm the compound to be cyanopentabenzylisonitrileiron(II) thiocyanate,

[Fe(C₆H₅CH₂NC)₅CN]SCN

Calculated for [Fe(C₆H₅CH₂NC)₅CN]SCN: C, 69.51; H, 4.86; N, 13.51; S, 4.42; Fe, 7.70. Found: C, 68.91; H, 4.97; N, 13.40; S, 4.52; Fe, 8.07.

EXAMPLE XII

*Preparation of Cyanopenta(p-Chlorobenzylisonitrile) Iron(II) Bromide,* [Fe(p-ClC₆H₄CH₂NC)₅CN]Br The compound p-chlorobenzyl bromide (51.2 parts) and 18.3 parts of potassium ferrocyanide are heated at about 100° C. for 60 hours. After cooling, the brown reaction mixture is extracted with petroleum ether, followed by boiling chloroform. The chloroform extract is evaporated to dryness and redissolved in the least amount of chloroform. The chloroform solution is then chromatographed on alumina, suspended in chloroform. Elution of the column with chloroform yields starting material. Elution is continued with a 50% by volume acetone-chloroform mixture, acetone, and methanol. The fraction collected from the methanol elution yields upon crystallization, 12.4 parts (27% yield) of an isonitrile complex. The complex is recrystallized four times from methyl ethyl ketone, and after drying under 0.1 mm. of Hg pressure at 25° C., the crystals melt over the range 160.2–162.6° C. Analyses verify the crystals to be cyanopenta(p-chlorobenzylisonitrile)iron(II) bromide,

[Fe(p-ClC₆H₄CH₂NC)₅CN]Br

Calculated for [Fe(p-ClC₆H₄CH₂NC)₅CN]Br: C, 53.54; H, 3.29; Fe, 6.07; Cl, 19.17; N, 9.14; and Br, 8.64. Found: C, 53.48; H, 3.50; Fe, 6.65; Cl, 18.84; N, 10.34; and Br, 6.95.

EXAMPLE XIII

*Preparation of Cyanopenta(p-Carbomethoxybenzylisonitrile)Iron(II) Bromide,*
[Fe(p-CH₃O₂CC₆H₄CH₂NC)₅CN]Br A mixture containing 57.5 parts of p-carbomethoxybenzyl bromide and 18.3 parts of potassium ferrocyanide is heated at 120–135° C. for 48 hours. After cooling the reaction mixture is extracted with petroleum ether, followed by boiling chloroform. The chloroform extract is evaporated under vacuum at room temperature, yielding 31 parts of a brown oil. The oil is dissolved in a minimum of chloroform and chromatographed on alumina, suspended in chloroform. The column is first eluted with chloroform and yields only starting material. Elution is continued with a 50% by volume chloroform-acetone mixture, acetone, a 50% by volume acetone-methanol mixture and finally, with methanol. The fraction collected from the methanol elution is evaporated under vacuum. A yellow isonitrile complex (10.7 parts) is obtained. The complex is recrystallized from methyl ethyl ketone and dried under 0.1 mm. of Hg pressure at 25° C. The compound, which melts over the range 185–186.2° C., analyzes for a hydrate of cyanopenta(p-carbomethoxybenzylisonitrile)iron(II) bromide,

[Fe(p-CH₃O₂CC₆H₄NC)₅CN]Br·H₂O

Calculated for

[Fe(p-CH₃O₂CC₆H₄CH₂NC)₅CN]Br·H₂O

C, 57.01; H, 4.48; N, 7.95; Fe, 5.28; Br, 7.56. Found: C, 57.29; H, 4.72; N, 8.22; Fe, 5.28; Br, 7.95.

EXAMPLE XIV

*Preparation of Cyanopenta(Triphenylmethylisonitrile)-Iron(II) Bromide,* [Fe[(C₆H₅)₃CNC]₅CN]Br A solution containing 16.2 parts of triphenylbromomethane and 3.67 parts of potassium ferrocyanide in 150 parts of chloroform is heated at reflux for 18 hours. The solution is then filtered and the filtrate is evaporated to dryness. The residue is dissolved in a minimum of a 50% by volume mixture of chloroform and carbon tetrachloride and is chromatographed on alumina suspended in carbon tetrachloride. The column is eluted first with a 50% by volume mixture of carbon tetrachloride and chloroform and then with chloroform. The fraction collected upon chloroform elution is allowed to evaporate, and 6.07 grams of a crystalline material is obtained. The crystals are recrystallized four times from a chloroform-carbon tetrachloride mixture. After drying under 0.1 mm. of Hg pressure at 56° C., the compound melts over the range 297–298° C. The compound analyzes for cyanopentatriphenylmethylisonitrile)iron(II) bromide,

[Fe[(C6H5)3CNC]5CN]Br

Calculated for [Fe[(C6H5)3CNC]5CN]Br: C, 80.41; H, 5.02; N, 5.57; Fe, 3.70; Br, 5.29. Found: C, 80.90; H, 5.25; N, 6.71; Fe, 3.89; Br, 4.08.

EXAMPLE XV

*Preparation of Cyanopenta(o-Methylbenzylisonitrile)-iron(II) Bromide, [Fe(o-CH3C6H4CH2NC)5CN]Br*

A mixture containing 92 parts of α-bromo-o-xylene and 36.5 parts of potassium ferrocyanide is heated with stirring at 100° C. for 45 hours in a flask closed with calcium chloride drying tubes. The mixture solidifies to a yellow crystalline mass. The mixture is extracted with boiling chloroform, and the extract is evaporated to dryness. A 2:1 volume mixture of methyl ethyl ketone and acetone is added to the residue, and the mixture is heated to reflux. The hot mixture is filtered, and upon cooling, the filtrate yields 66 parts of a crystalline material. After one recrystallization from methyl ethyl ketone and drying under 0.1 mm. of Hg pressure at 25° C., the crystals melt over the range 143.4–145.6° C. Analyses indicate the composition to be consistent with the formula

[Fe(o-CH3C6H4CH2NC)5CN]Br

Calculated for [Fe(o-CH3C6H4CH2NC)5CN]Br: C, 67.57; H, 5.55; N, 10.28; Fe, 6.83; Br, 9.77. Found: C, 67.12; H, 5.65; N, 11.67; Fe, 7.07; Br, 8.67.

EXAMPLE XVI

*Preparation of Cyanopentabenzylisonitrileiron(II) Hydrogen Sulfate, [Fe(C6H5CH2NC)5CN]HSO4*

An aqueous solution of sulfuric acid is prepared by adding 84 parts of 97% sulfuric acid to 20 parts of water. After the solution cools to room temperature, 36 parts of cyanopentabenzylisonitrileiron(II) bromide are added and the mixture is heated on a steam bath for four hours. The reaction mixture is cooled to room temperature and poured into ice water. A yellow, water-insoluble oil separates out which solidifies after washing with fresh portions of water. The solid is recrystallized three times from methyl ethyl ketone and dried under 0.1 mm. of Hg pressure at 56° C. The crystals melt over the range 156.8–157.8° C. The compound analyzes for cyanopentabenzylisonitrileiron(II) hydrogen sulfate,

[Fe(C6H5CH2NC)5CN]HSO4·H2O

Calculated for [Fe(C6H5CH2NC)5CN]HSO4·H2O: C, 62.99; H, 4.88; N, 10.74; S, 4.10; Fe, 7.14. Found: C, 63.26; H, 4.82; N, 9.93; S, 3.90 Fe, 7.57.

EXAMPLE XVII

*Preparation of Cyanopentabenzylisonitrileiron(II) Bromide, [Fe(C6H5CH2NC)5CN]Br*

To a solution containing 500 parts of benzyl bromide in 400 parts of methyl ethyl ketone are added 121 parts of potassium ferrocyanide. The mixture is refluxed for 92 hours and filtered while hot. The residue is extracted with hot methyl ethyl ketone and the insoluble material is discarded. The extract is combined with the filtrate, and the solution is evaporated to remove the methyl ethyl ketone. The oily material which remains is extracted with petroleum ether. The petroleum ether insoluble material is then dissolved in a minimum of hot methyl ethyl ketone, and upon cooling the solution, a crystalline product separates out. The product is recrystallized three times from methyl ethyl ketone and dried under 0.1 mm. of Hg pressure at 25° C. The crystals do not depress the melting point of a sample of cyanopentabenzylisonitrileiron(II) bromide, prepared as in Example I, and the infrared spectra of the two samples are superimposable.

EXAMPLE XVIII

*Preparation of Cyanopentabenzylisonitrileiron(II) Bromide From Tetramethylammonium Ferrocyanide and Benzyl Bromide*

Dry tetramethylammonium ferrocyanide (7 parts) and 42 parts of benzyl bromide are heated together on a steam bath for 48 hours. The cooled reaction mixture is extracted with petroleum ether, and the insoluble residue is extracted with chloroform. The chloroform extracts are evaporated to dryness and are recrystallized from methyl ethyl ketone. The crystals do not depress the melting point of a sample of cyanopentabenzylisonitrileiron(II) bromide, prepared as in Example I, and the infrared spectra of the two samples are identical.

EXAMPLE XIX

*Preparation of Cyanopentabenzylisonitrileiron(II) Bromide From Lithium Ferrocyanide and Benzyl Bromide*

Following the procedure of Example XVIII, except that 10 parts of lithium ferrocyanide and 45 parts of benzyl bromide are employed, yields cyanopentabenzylisonitrileiron(II) bromide, identical in composition and structure with that prepared according to the procedure of Example I.

EXAMPLE XX

*Preparation of Cyanopenta(β-Thienylmethylisonitrile)-Iron(II) Bromide*

3-bromomethylthiophene is prepared according to the method of Campaign, J. Am. Chem. Soc. 70, 1555 (1948), from 55 parts of 3-methylthiophene in 150 parts of carbon tetrachloride, 88.5 parts of N-bromosuccinimide and 0.2 part of benzoyl peroxide. The solution containing the impure product is evaporated to dryness, taken up in 150 parts of methyl ethyl ketone and mixed with 36 parts of potassium ferrocyanide. The mixture is heated to reflux on a steam bath for 48 hours. The reaction mixture is filtered while hot and the residue is extracted with boiling methanol. The filtrate and extracts are combined and evaporated to dryness at reduced pressure. The black oil obtained is extracted three times with diethyl ether and the tar-like residue (64 parts) is dissolved in chloroform and chromatographed on alumina. The eluting solvents, in order of their use are: chloroform, 50% chloroform-acetone, acetone, 50% acetone-methanol and methanol. Eluates from the acetone, acetone-methanol and methanol elutions are combined and evaporated to dryness. The product is a brown, non-crystalline material, still containing impurities. The elemental and spectrophotometric analyses approximate those expected for cyanopenta(β-thienylmethylisonitrile)iron(II) bromide, having the formula:

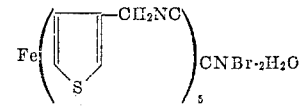

Calculated for [Fe(C4H3SCH2NC)5CN]Br·2H2O: C, 45.8; H, 3.57; N, 10.33; Fe, 6.87. Found: C, 41.67; H, 3.28; N, 8.28; Fe, 6.94

The process leading to the novel iron compounds has as an essential feature reacting at elevated temperatures a mixture containing an alkali metal ferrocyanide and an activated alkylating agent, usually but not necessarily in the absence of solvent. The nature of the reaction is complex and its mechanism is not completely understood. The net effect, however, is the transformation of the alkylating agent into an aliphatic isonitrile ligand by the attachment of the activated carbon of the alkylating agent to nitrogen of the ferrocyanide. The reaction occurs with any alkali metal ferrocyanide or tetrasubstituted ammonium ferrocyanide, although potassium ferrocyanide is generally preferred.

The alkylating agents are compounds of the formula R'₂R"CX', wherein each of the R' radicals is either hydrogen, lower alkyl (one to six carbon atoms) or aryl; wherein R" is an activating group; and wherein X' is an anion selected from the group consisting of chloride, bromide and sulfonate. The activating group is a radical containing at least one carbon-to-carbon multiple bond, such as phenyl, vinyl, thienyl, furyl, ethynyl, naphthyl, and the like, and is bonded to the carbon of the alkylating agent through one of the multiple-bonded carbon atoms. The presence of non-reactive groups such as alkyl, halo, carbalkoxy, alkoxy, and the like, as substituents on the activating group is permissible and comes within the scope of this invention.

Of course, substituents which are known to be reactive toward either of the starting materials are to be avoided. These include such radicals as amino groups, which react with the alkylating agent, and acidic groups which are stronger acids than ferrocyanic acid, such as sulfonic acid groups, which react with the ferrocyanide. Permissible acidic substituents have acidity constants ($K_a$) less than about $10^{-7}$. The presence of other substituents on the activating group affect only the rate of the alkylation reaction. For example, it has been found that reactions employing alkylating agents having substituted-phenyl activating groups, in which the substituent has a Hammett substitution constant ($\sigma$) less than about +0.7 (Hammett, L. P., "Physical Organic Chemistry," McGraw-Hill Book Co., Inc., New York, N.Y., 1940, page 188), provide high yields of the isonitrile complexes within 10–100 hours at 100° C. In contrast, those reactions employing alkylating agents such as p-nitrobenzyl bromide, p-cyanobenzyl bromide, p-acetylbenzyl bromide, p-formylbenzyl bromide and the like, tend to be very slow reactions and may require longer reaction times at the same temperature, for instance, 200 hours or more before significant yields of the complexes are obtained.

Suitable alkylating agents include, among others, propargyl chloride, α-bromopicolines, bromomethylfuran, α-bromoethylcyclopentadiene, p-bromomethylbiphenyl, α-chloroxylene, α-bromoethylbenzene, β-naphthylmethyl bromide and the like.

The reaction with respect to compounds activated through carbon-to-carbon multiple bonding represents a preferred embodiment of the present invention. However, it is also within the scope of this invention to utilize as starting materials alkylating agents activated through multiple bonding present in a form other than carbon-to-carbon bonding, for example, as in carbalkoxy, keto, cyano, etc. groups.

The process of the invention may be operated without extraneous solvent when the organic reactant is a liquid at operating temperatures. Alternatively, a diluent such as methyl ethyl ketone, acetonitrile or dimethylformamide may be employed without detrimental effect. Those reaction systems in which both reactants are solids at operating temperatures are carried out in the presence of an inert solvent. Methyl ethyl ketone, dimethylformamide, acetonitrile and the like which dissolve at least one of the reactants are satisfactory for this purpose.

It is generally desirable to carry out the process at temperatures between 50° and 175° C. Reactions run below 50° C. are normally too slow to be practical. The only limitation on the use of elevated temperatures is that the temperature be below the decomposition temperatures of the starting materials and/or products. However, it is seldom advantageous to operate above 175° C. since side reactions tend to complicate the separation of the desired product. The preferred operating temperatures occur within the range 75–150° C. The reaction time depends upon several factors, including the nature of the reactants and the temperature.

Essentially stoichiometric quantities of reactants, that is, a 5:1 mole ratio of alkylating agent to ferrocyanide, are preferred for the preparation of the iron pentaisonitrile compounds. However, excesses of the order of 50% of either reactant do not interfere with the operation of the process, although from the standpoint of cost and purity of product, undue excesses are avoided.

The dissociation of the complexes into stable $[FeZ_5CN]^+$ cations in polar organic solvents permits the preparation of other salt derivatives by metathetical exchange. Usually the conversion is brought about by treating a solution of a halide with the silver salt of the desired anion. The choice of the exchange salt is primarily one of convenience, however, and many modifications and alternatives are, therefore, possible. Salts which may be prepared metathetically, in addition to those illustrated in the foregoing examples include, for instance, phosphates, chloroplatinates, fluoroborates, bromates, chlorates, picrates, carboxylates such as trichloroacetate, 2,4-dinitrobenzoates, oxalates, and the like.

Products obtained in the form of hydrates may be converted to anhydrous compounds by heating at reduced pressures.

Techniques involving extraction and chromatography are useful for the separation and purification of the final products. Although alternative procedures may be employed, these were chosen as the techniques most likely to lead to crystalline products. Details of the chromatographic procedure are as follows. Absorbent is prepared from 80–200 mesh activated alumina. The alumina is treated with an aqueous sulfuric acid solution until the pH of the supernatant liquor remains constant at 6.70–7.00. The liquid is then removed by filtration, and the alumina is dried at 120–150° C. under 24 mm. of Hg pressure for 14 hours. A slurry of the dried materials, usually in carbon tetrachloride, is used in the chromatographic columns. A weight of alumina ten to fifteen times the weight of the material to be chromatographed is found satisfactory. The samples are usually dissolved in carbon tetrachloride, poured onto the column and eluted successively with solvents of increasing polarity; for instance, the series of solvents, chloroform, chloroform-acetone, acetone-methanol, methanol. Eluate is collected in aliquot fractions. When it appears that the absorbtive is no longer removed with the eluting solvent, elution is begun with that of the next order of polarity. When elution is complete, the aliquots are allowed to evaporate to dryness and the quantity eluted in each fraction is determined. By plotting quantity eluted versus fraction, a curve is obtained which indicates the separation of products effected and, therefore, the fractions to be combined for recrystallization.

The iron-isonitrile complexes of this invention are, for the most part, crystalline substances, generally light in color and diamagnetic, having fairly sharp melting points. They are insoluble in water but dissolve in liquids such as chloroform, nitromethane, acetonitrile, ketones, alcohols and the like. Dissolution occurs with dissociation in polar organic solvents. The complexes are not air oxidized, although they are decomposed by hot base. The isonitrile ligands are extremely strongly attached and even under very vigorous reaction conditions are not easily replaced.

Surprisingly, they exhibit practically none of the properties generally associated with organic isonitrile compounds. The most obvious differences between the iron-isonitrile complexes and the corresponding uncomplexed isonitriles relate to chemical stability. For example, the hydrolytic stabilites are extremely different. An uncomplexed isonitrile such as benzyl isonitrile is hydrolyzed readily in 0.1 N H⁺ to the formamide. Conversion of the complexed benzyl isonitrile, as in the cyanopentabenzylisonitrileiron(II) bromide, to the formamide requires refluxing for 49 hours in an aqueous solution containing 20% sulfuric acid and 50% acetic acid. The benzylisonitrile complex is even recovered unchanged after refluxing for 3 hours with concentrated hydrochloric acid. Another rather startling observation is that cyanopentabenzylisonitrileiron(II) bromide undergoes no detectable decomposition after one year's exposure to sunlight and "atmospheric conditions" in the laboratory. Benzylisonitrile would very likely decompose hydrolytically, dimerize or possibly even polymerize under the same set of conditions.

Structures of the novel iron complexes are assigned on the basis of chemical and physical evidence assembled from degradation studies, elemental analyses, conductivities, molecular weights, infrared and nuclear magnetic resonance spectra, and the like. Unlike the starting materials, the complexes characteristically show two absorption peaks in the 4.5 to 4.8 micron region of the infrared spectrum. Confirmation of the attachment of the ligands to the iron through carbon, i.e., that isonitriles and not nitriles are involved in complexation, was provided from hydrogenation and hydrolysis studies. Hydrolysis of the iron-benzylisonitrile complexes in a refluxing aqueous mixture containing 20% sulfuric acid and 40% acetic acid for two days produced only benzylamine and N-benzylformamide. Hydrogenation of the benzylisonitrile complexes in methanol using a Raney nickel catalyst at 130° C. under 200 atmospheres pressure gave as sole product benzylamine and N-methyl benzylamine. These products would not be expected from the hydrolysis or hydrogenation of benzylnitrile but are the expected products of such reactions with benzylisonitrile.

The cyanopentaisonitrileiron(II) complexes are useful intermediates in the production of a number of organic compounds; for example, for the preparation of ethers and for the preparation of organic isonitriles. When a solution containing cyanopentabenzylisonitrileiron(II) bromide in methyl alcohol is pressurized in a stainless steel vessel to 850 atmospheres with nitrogen and heated at 175° C. for six hours, methyl benzyl ether in good conversion is obtained. Similar runs with isopropyl alcohol and with n-butyl alcohol produce isopropyl benzyl ether and n-butyl benzyl ether, respectively. This type ether has many uses, e.g., butyl benzyl and ethyl benzyl ethers are insecticidal toward and repress the flight activity of mosquitos; alkyl-substituted benzyl ethyl ethers, such as p-methylbenzyl butyl ether, may be used as combatants of body lice and aromatic-substituted methyl alkyl ethers are effective contact poisons for the control of insect pests, such as red spiders, which are particularly difficult to control.

Organic isonitrile compounds are obtained by the reaction of the isonitrile complexes with cyanide and are useful to denature alcohol. For instance, benzylisonitrile is obtained when a mixture containing 15 parts of the ironpentabenzylisonitrile complex of Example I, 4.2 parts of potassium cyanide and 130 parts of dry 1,2-dimethoxyethane is reacted for 5 hours at 150° C. under 700 atmospheres of nitrogen pressure in a stainless steel reaction vessel. The yellow solution obtained is extracted with chloroform and with acetone and the combined extracts are treated with ether. After filtration, distillation of the filtrate at reduced pressure (20 mm. of Hg) yields 4.12 parts of benzylisonitrile, boiling over the temperature range, 95–113° C.

Analogously allylisonitrile is obtained from the ironpentaallylisonitrile complex prepared in Exampe VII. Thus a mixture containing 6.5 parts of the complex, 2.4 parts of potassium cyanide and 85 parts of 1,2-dimethoxyethane is heated for 4 hours at 120° C. under 700 atmospheres of nitrogen pressure. After cooling, the contents of the reaction vessel are washed with fresh 1,2-dimethoxyethane and filtered. Distillation of the filtrate at ordinary pressures yields 1.12 parts of allylisonitrile, boiling over the range 103–106° C.

A further use of these complexes is as catalysts. As little as 1% of an addition product of cyanopentabenzylisonitrileiron(II) bromide and antimony pentachloride catalyzes the conventional polymerization of acrylonitrile to high-molecular-weight polymers. The complexes are also effective hydrogenation and carbonylation catalysts. In one instance, acrylonitrile in the presence of a pentabenzylisonitrile complex was hydrogenated to propylamine. A pentabenzylisonitrile complex was also effective for the carbonylation of ethylene to diethyl ketone.

In addition, these complexes, particularly cyanopentabenzylisonitrileiron(II) bromide and cyanopenta-(p-methylbenzylisonitrile)iron(II) bromide, are effective agricultural fungicides against early tomato blight when applied from a 0.2% solution and against apple scab when applied from a 0.008% solution, each solution being prepared in either water or acetone.

Other uses and modifications will be apparent to those skilled in the art.

I claim:

1. The composition of matter having the general formula $[Fe(R'_2R''CNC)_5CN]_yX$ wherein $R'$ is selected from the group consisting of hydrogen, lower alkyl and monocyclic and dicyclic aryl radicals, $R''$ is a member selected from the group consisting of heterocyclic radicals, ethynyl radicals, naphthyl radicals, phenyl and substituted phenyl radicals and vinyl and substituted vinyl radicals, said substituents being selected from the group consisting of alkyl, halo, carbalkoxy and alkoxy radicals, $X$ is an anion, and $y$ is an integer equal in magnitude to the valence of said anion.

2. The composition of matter of claim 1 wherein $X$ is chloride ion.

3. The composition of matter of claim 1 wherein $X$ is bromide ion.

4. The composition of matter of claim 1 wherein $X$ is nitrate ion.

5. The composition of matter of claim 1 wherein $X$ is perchlorate ion.

6. A composition of matter comprising cyanopentabenzylisonitrileiron(II) bromide having the formula

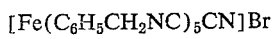

7. A composition of matter comprising cyanopentaallylisonitrileiron(II) bromide having the formula

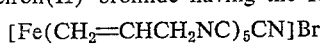

8. A composition of matter comprising cyanopentabenzylisonitrileiron(II) perchlorate having the formula

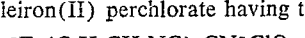

9. A composition of matter comprising cyanopentabenzylisonitrileiron(II) chloride having the formula

10. A composition of matter comprising cyanopentabenzylisonitrileiron(II) nitrate having the formula

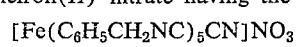

11. A process for the preparation of an ironisonitrile compound comprising mixing at a temperature above about 50° C., (1) a composition from the group consisting of an alkali metal ferrocyanide and tetra(lower alkyl)substituted ammonium ferrocyanide, with (2) an alkylating agent of the formula $R'_2R''CX'$, wherein each of $R'$ is one of the group consisting of hydrogen, monocyclic and dicyclic aryl and lower alkyl radicals, and $R''$ is a radical selected from the group consisting of ethynyl radicals, naphthyl radicals, phenyl and substituted phenyl radicals, vinyl and substituted vinyl radicals, said substituents being selected from the group consisting of alkyl, halo, carbalkoxy and alkoxy radicals and heterocyclic radicals provided that said heterocyclic radicals contain at least one carbon-to-carbon double bond, adjacent and singly bound to the carbon bearing $X'$, and $X'$ is an anion selected from the group consisting of chloride, bromide and sulfonate.

12. The process of claim 11 wherein $R''$ is a radical from the group consisting of phenyl, substituted phenyl, vinyl and substituted vinyl, wherein said substituents are selected from the group consisting of alkyl, halo, carbalkoxy and alkoxy radicals.

13. The process of claim 11 wherein X' comprises bromide.

14. The process of claim 11 wherein X' comprises chloride.

15. A process for preparing cyanopentabenzylisonitrile-iron(II) bromide which comprises mixing benzyl bromide with potassium ferrocyanide at a temperature between about 50–175° C.

16. A process for preparing cyanopentabenzylisonitrile-iron(II) chloride which comprises mixing benzyl chloride with potassium ferrocyanide at a temperature between about 50–175° C.

17. The composition of matter of claim 1 wherein R' is hydrogen and R" is phenyl.

18. The composition of matter of claim 1 wherein each R' is hydrogen and R" is the radical, $CH_2=CH-$.

19. The composition of matter having the general formula $[Fe(R_2'R''CNC)_5CN]_yX$ wherein R' is selected from the group consisting of hydrogen, lower alkyl and monocyclic and dicyclic aryl radicals and R" is a radical selected from the group consisting of phenyl, substituted phenyl, vinyl and substituted vinyl, said substituents being selected from the group consisting of alkyl, halo, carbalkoxy and alkoxy radicals, X is an anion, and y is an integer equal in magnitude to the valence of said anion.

No references cited.